US008477872B2

(12) United States Patent
Zhang et al.

(10) Patent No.: US 8,477,872 B2
(45) Date of Patent: Jul. 2, 2013

(54) MULTI-ANTENNA SYSTEM AND METHOD FOR TRANSMITTING AND RECEIVING INFORMATION IN MULTI-ANTENNA SYSTEM

(75) Inventors: Ranran Zhang, Beijing (CN); Qiubin Gao, Beijing (CN); Deshan Miao, Beijing (CN); Meifang Jing, Beijing (CN); Gaishi La, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/521,734

(22) PCT Filed: Jan. 11, 2011

(86) PCT No.: PCT/CN2011/070150
§ 371 (c)(1),
(2), (4) Date: Jul. 11, 2012

(87) PCT Pub. No.: WO2011/082698
PCT Pub. Date: Jul. 14, 2011

(65) Prior Publication Data
US 2013/0034179 A1     Feb. 7, 2013

(51) Int. Cl.
*H04B 7/06*          (2006.01)
*H04L 27/00*         (2006.01)

(52) U.S. Cl.
USPC ........................... 375/299; 375/377; 455/101

(58) Field of Classification Search
USPC ................. 375/259, 267, 295, 299, 316, 247, 375/377; 455/99, 101, 132; 370/203, 210
See application file for complete search history.

(56) References Cited

U.S. PATENT DOCUMENTS

| 8,199,836 B2* | 6/2012 | Khojastepour et al. | 375/260 |
| 8,325,852 B2* | 12/2012 | Zhang et al. | 375/299 |
| 2008/0292013 A1* | 11/2008 | Varadarajan et al. | 375/260 |
| 2008/0303699 A1* | 12/2008 | Zhang et al. | 341/67 |
| 2008/0303701 A1* | 12/2008 | Zhang et al. | 341/106 |
| 2009/0274225 A1* | 11/2009 | Khojastepour et al. | 375/260 |
| 2010/0034308 A1* | 2/2010 | Kim et al. | 375/267 |

(Continued)

FOREIGN PATENT DOCUMENTS

| CN | 101414864 | 4/2009 |
| CN | 101527617 | 9/2009 |
| WO | WO-2008/086239 A1 | 7/2008 |

OTHER PUBLICATIONS

Warner Weichselberger,"On the Decomposition of the MIMO Channel Correlation Tensor," IEEE, 2004 ITG Workshop on Smart Antenna, pp. 268-273.*

*Primary Examiner* — Tesfaldet Bocure
(74) *Attorney, Agent, or Firm* — Marshall, Gerstein & Borun LLP

(57) ABSTRACT

Embodiments of the present invention provide a method for transmitting information in a multi-antenna system. The method may include: a transmitting end receives information transmitted by a receiving end, wherein the information includes information of index of a precoder; the transmitting end selects a precoder from a two-layered codebook based on the information of the index of the precoder; the transmitting end precodes to-be-transmitted data by using the precoder; the transmitting end transmits the precoded data to the receiving end. The technical scheme of the present invention obtains codebooks most matching with channel distribution characteristics of dual-polarized antennas and minimizes performance loss brought by codebook quantization to remarkably improve the performances of precoding systems.

13 Claims, 4 Drawing Sheets

U.S. PATENT DOCUMENTS

2010/0188966 A1* 7/2010 Pun et al. ..................... 370/203
2010/0215112 A1* 8/2010 Tsai et al. ..................... 375/267
2011/0142166 A1* 6/2011 Kim et al. ..................... 375/296
2012/0219091 A1* 8/2012 Li et al. ........................ 375/296

* cited by examiner

MULTI-ANTENNA SYSTEM AND METHOD FOR TRANSMITTING AND RECEIVING INFORMATION IN MULTI-ANTENNA SYSTEM

TECHNICAL FIELD

The present invention relates to data communications, and particularly, to a multi-antenna system, and a method for transmitting and receiving information in a multi-antenna system.

BACKGROUND

Physical layer multi-antenna technique has become one of key techniques in the next generation wireless communication systems. The multi-antenna technique has many advantages, such as increasing system throughput by multiplexing gain of multiple antennas, improving system performance by diversity gain of multiple antennas, eliminating multiuser interference between different receiving terminals by directional beamforming gain of the antennas, and so on.

MIMO (Multiple-Input Multiple-Output) systems use multiple transmit and receive antennas to obtain capacity, diversity and array gain by jointly processing signals in space, time and frequency domains. In a MIMO system, if a transmitter can obtain channel information in a certain way, transmission signals can be optimized by using channel characteristics to improve receiving quality and reduce the requirements for receiver complexity. In practice, quantized channel information is adopted for feeding back channel information to reduce feedback overhead and feedback delay. The quantized channel information may be a channel matrix or statistics of the channel matrix, or a parameter for pre-processing recommended by the receiver. Quantized channel information is mapped onto a set composed of a limited amount of elements which is referred to as a codebook.

In a codebook-based closed loop MIMO system, a receiving end receives signals transmitted by a transmitting end, and converts the signals into frequency domain signals by FFT (Fast Fourier Transform). Then the signals are divided into several layers (or streams) by a MIMO detection module. After de-layer mapping, the signals are then demodulated, de-interleaved and decoded. The received pilot signals are inputted into a channel estimation module for channel estimation. The receiving end selects a precoder from the codebook based on channel estimation information to optimize the performance. The optimization criterion may be FER (Frame Error Rate), BER (Bit Error Rate), SINR (Signal to Interference plus Noise Ratio), mutual information, instantaneous throughput, or other proper criteria. The receiving end generates an index of the selected precoder for subsequent transmission of the transmitting end. The receiving end generates a CQI (Channel Quality Indication) to inform the transmitting end of the quality of the channel. The receiving end may further determine a rank and the number of data layers corresponding to the rank for subsequent data transmission. The rank is the number of layers of a signal transmitted in the MIMO system. All of the above obtained parameters, including the precoder index, the CQI and the rank, are fed back to the transmitting end. The transmitting end processes multiple to-be-sent data streams by using a selected MCS (Modulation and Coding Scheme). A precoder is selected from the codebook according to precoder selection information. Each data stream is mapped to several layers to achieve a required transmission data rate. Then, the data after layer-mapping is pre-coded using the selected precoder. Finally, each data stream after precoding is modulated by using OFDM (Orthogonal Frequency Division Multiplexing), and then transmitted via multiple transmit antennas.

SUMMARY

The present invention is for solving at least one of the defects existing in the above techniques, and particularly provides a dual-level codebook, and implements transmission and reception by using the dual-level codebook in a multi-antenna system.

In order to achieve the above objective, embodiments of the present invention provide a method for transmitting information in a multi-antenna system which may include:

receiving, by a transmitting end, information transmitted by a receiving end, wherein the information includes information of an index of a precoder; selecting by the transmitting end, a precoder from a dual-level codebook based on the information of the index of the precoder; precoding, by the transmitting end, to-be-transmitted data by using the precoder; transmitting, by the transmitting end, the precoded data to the receiving end.

Embodiments of the present invention also provide a method for receiving information in a multi-antenna system which may include:

receiving, by a receiving end, information transmitted by a transmitting end, and measuring a channel by using the information; selecting, by the receiving end, a precoder from a dual-level codebook according to information of the channel; transmitting, by the receiving end, information of an index of the precoder to the transmitting end.

Embodiments of the present invention also provide a multi-antenna system including a transmitting end and a receiving end. The transmitting end includes a receiving module, a precoding module and a transmitting module;

the receiving module is for receiving information transmitted by the receiving end, wherein the information includes information of an index of a precoder; the precoding module is for selecting a precoder from a dual-level codebook according to the information of the index of the precoder, and precoding to-be-transmitted data by using the precoder; the transmitting module is for transmitting the precoded data to the receiving module.

The technical scheme of the present invention obtains a codebook most conforming to channel distribution characteristics of dual-polarized antennas and minimizes performance loss brought by codebook quantization to remarkably improve the performance of the precoding system. In addition, the codebook generated according to the present invention inherits most characteristics of the codebook for 4 antennas of Rel-8 LTE, has good performance. When the codebook of Rank-N is designed properly, the codebook has nesting characteristic, and the technical scheme requires little modification to existing systems without impacting system compatibility, and has low implementation complexity and is highly efficient.

Other aspects and merits of the present invention are explained in the following descriptions, and some of them will become more apparent or be understood through embodiments of the present invention.

BRIEF DESCRIPTION OF THE DRAWINGS

A few embodiments of the present invention will be described in the following with reference to the accompanying drawings to make the above and/or additional aspects and merits of the present invention more apparent and readily understood.

EMBODIMENTS OF THE INVENTION

Figure 1:
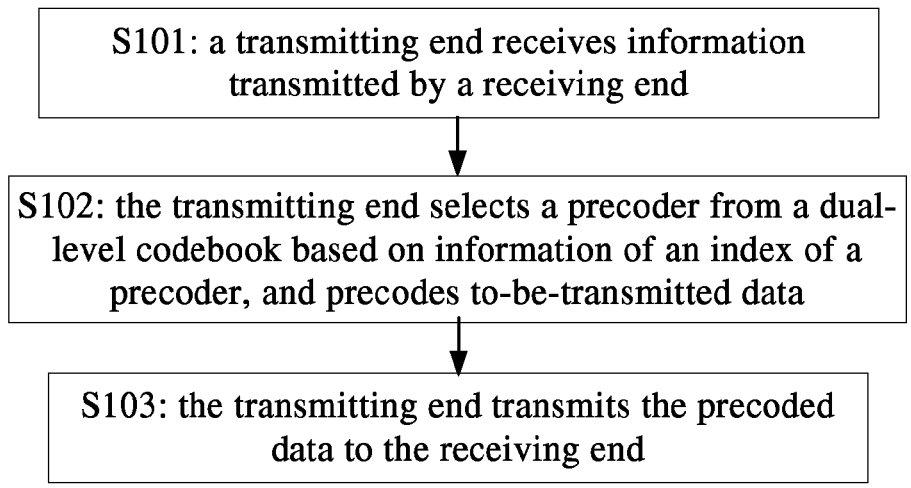
FIG. 1 is a flowchart illustrating a transmitting method of a multi-antenna system in accordance with an embodiment of the present invention.

Embodiments of the present invention are described hereinafter in detail. Some examples are illustrated in the drawings. The same or similar reference sign represents the same or similar component or components with the same or similar functions. The following embodiments described with reference to the accompanying drawings are merely exemplary, and are only for explaining the present invention, not for limiting the protection scope of the present invention.

In the codebook-based closed loop MIMO system, the codebook adopted is the key factor affecting the system performances. Transmission modes 4, 5 and 6 of Rel-8 (Release 8) LTE (Long Term Evolution) all adopt a PMI (Precoding Matrix Indicator) feedback scheme, i.e., a UE (User Equipment) measures the channel by using a common pilot, and informs an eNB of information of the index of a recommended precoder. When the number of cell-specific reference signal ports is 4, the Householder transformation based codebook may be adopted. For each rank in a closed loop space multiplexing mode, i.e. the transmission mode 4, there are 16 candidate precoding matrices.

The codebook for 4 antennas in Rel-8 LTE has the following main characteristics: 1) the codebook of rank 1 is obtained by searching with tradeoff between correlated channels and non-correlated channels taken into consideration; 2) codebooks of other ranks are in nesting relations with the codebook of rank 1; 3) codebook elements are all 8PSK (Phase Shift Keying) elements to reduce computation complexity; 4) the codebooks have constant modulus and unitary characteristics; 5) complexity of precoder selection can be reduced by using characteristics of Householder transformation.

Wireless communication systems adopting MIMO, such as Rel-10 (Release 10) LTE-A (Long Term Evolution-Advanced) systems, may still adopt the PMI feedback scheme. Due to the increasing in the number of transmit antennas, e.g. there may be 8 transmit antennas, the number of configuration combinations of rank and transmitting antenna ports is a lot more than that in Rel-8 LTE systems. There is no codebook defined for a large amount of configuration combinations of rank and the number of transmitting antenna ports. In addition, compared with Rel-8 LTE systems, it is more urgent to design a codebook for dual-polarized multi-antenna systems because of the increasing number of antennas and the limited size of the base station, it is inevitable to reduce antenna spacing or/and adopt polarized antennas. In view of the foregoing, a linear codebook for dual-polarized multi-antenna systems and the design method of the codebook is an indispensable technique in research and standardization of future wireless communication systems. Due to the good performance and outstanding characteristics of the codebook for 4 antennas adopted by Rel-8 LTE, researchers are considering maintaining as much the characteristics of the codebook of Rel-8 LTE as possible during codebook designing.

Researches show the Householder transformation method can not be directly applied to the design of codebook for 8 antennas. At present, codebooks which can inherit all or part of the characteristics of codebooks for Rel-8 LTE mainly include the following types of codebooks:

codebook 1: a codebook for 8 antennas is a transformed version of the codebook of Rel-8 LTE;

codebook 2: constructing 8×8 complex matrices by utilizing Hadamard transformation, where the number of the complex matrices is $4^7$ and elements in the matrices are 8PSK elements, and searching to obtain a codebook for each rank by using a method for optimizing the tradeoff between correlated channels and non-correlated channels;

codebook 3: multiplying 16 different diagonal matrices with an 8-DFT (Discrete Fourier Transform) matrix to obtain a codebook for rank 8, and forming a codebook for Rank-n by using the first n columns of the 16 8×8 complex matrices;

codebook 4: constructing a codebook for rank 1 composed of rows (or columns) of an 8-DFT matrix and an 8×8 unitary matrix, and performing transformation on the codebook of Rel-8 LTE to obtain a codebook for Rank 2, where the codebook for rank 2 and the codebook for rank 1 have nesting characteristics.

The above schemes all have defects.

The codebook 1 inherits part of characteristics of the codebook for 4 antennas of Rel-8 LTE, i.e., the constant modulus characteristic and having 8PSK elements, but there is no nesting relation. Although the design of codebook 1 takes channel distribution characteristics of dual-polarized multi-antenna systems into consideration, the codebook fails to take full consideration of relations between two groups of polarized antenna, which results in performance loss when the codebook is adopted in a dual-polarized multi-antenna system.

The codebook 2 inherits most of the characteristics of the codebook for 4 antennas of Rel-8 LTE, i.e., the constant modulus, unitary, nesting characteristic, including only 8PSK elements. Since the codebook 2 searches for a codebook within a space formed by the $4^7$ 8×8 complex matrices composed of 8PSK elements and the search process is not optimized particularly for channel characteristics of dual-polarized multi-antenna systems, the codebook may generate performance loss when applied in a dual-polarized multi-antenna system.

The codebook 3 inherits some of the characteristics of the codebook for 8 antennas of Rel-8 LTE, i.e. constant modulus, unitary, nesting characteristic, but adopts 16PSK elements, thus results in increased computation complexity of the precoding process. When compared with other codebooks, the codebook 3 does not have remarkable performance gains, and the increased precoding computation complexity becomes extra burden.

The codebook 4 inherits some of the characteristics of the codebook for 4 antennas of Rel-8 LTE, i.e. constant modulus, unitary, nesting characteristic, and having only 8PSK elements. Since DFT matrices conform to the structure of array response but do not fully matches with channel distribution characteristics of dual-polarized multi-antenna systems. Codebooks 3 and 4 are more suitable for linear array multi-antenna precoding MIMO system, but may result in performance loss in dual-polarized multi-antenna systems.

Therefore, there is the need of an effective codebook designing scheme which generates a codebook conforming to channel distribution characteristics of dual-polarized antennas and minimizes performance loss brought by codebook quantization to remarkably improve the performance of precoding systems.

To achieve an objective of the present invention, an embodiment of the present invention provides a method for transmitting information in a multi-antenna system. The method may include: receiving, by a transmitting end, information transmitted by a receiving end, wherein the information includes information of an index of a precoder; selecting, by the transmitting end, a precoder from a dual-level codebook based on the information of the index of the precoder; precoding, by the transmitting end, to-be-transmitted data by using the precoder; transmitting, by the transmitting end, the precoded data to the receiving end.

FIG. 1 is a flowchart illustrating a transmitting method of a multi-antenna system in accordance with an embodiment of the present invention. The method may include the following procedures.

In block S101, a transmitting end receives information transmitted by a receiving end.

In block S101, the information received by the transmitting end from the receiving end may include information of an index of a precoder. Specifically, the transmitting end receives information which may include a CQI, Rank selection information and precoder selection information and so on fed back by a receiving end to obtain information of the channel. The CQI, Rank selection information and precoder selection information may be used in subsequent transmission process.

In block S102, the transmitting end selects a precoder corresponding to the information of the index of the precoder from a dual-level codebook, and precodes to-be-transmitted data by using the precoder.

In block S102, the transmitting end may select a precoder corresponding to the information of the index of the precoder from the dual-level codebook, precode the to-be-transmitted data by utilizing the precoder or by utilizing a precoding matrix obtained by processing the precoder, such as performing zero-forcing on the precoder.

Specifically, the transmitting end processes multiple to-be-transmitted data streams by using a selected MCS. MCS is selected based on channel quality between the transmitting end and the receiving end, and the channel quality is provided by the receiving end in form of CQI. A precoder is selected from the codebook according to precoder selection information. The codebook will be described in detail in the following. Each data stream is mapped to several layers to achieve a required transmission data rate. Then, the data through layer mapping is precoded using the selected precoder or using a precoding matrix obtained by processing the precoder, e.g. performing zero-forcing on the precoder, etc. Finally, each precoded data stream is processed through OFDM modulation and transmitted through multiple antennas. The number of layers of the data is referred to as rank.

The dual-level codebook may be constituted by a base codebook and a transform codebook.

A base precoder in the base codebook is a $N_T/2 \times N$ matrix. The transform codebook defines a mapping scheme for transforming a base precoder into a $N_T \times N$ precoder c. $N_T$ is the number of transforming it antennas of the MIMO system, N is rank, i.e. the number of layers of a transmitted signal in the MIMO system.

A precoder c in the dual-level codebook may satisfy:

$$c = \left[ \begin{bmatrix} 1 \\ \varphi_{m,1} \end{bmatrix} \otimes w(:,1) \begin{bmatrix} 1 \\ \varphi_{m,2} \end{bmatrix} \otimes w(:,2) \cdots \begin{bmatrix} 1 \\ \varphi_{m,N} \end{bmatrix} \otimes w(:,N) \right]$$

that is, $$c = \begin{bmatrix} w(:,1) & w(:,2) & \cdots & w(:,N) \\ \varphi_{m,1} w(:,1) & \varphi_{m,2} w(:,2) & \cdots & \varphi_{m,N} w(:,N) \end{bmatrix}$$

where, w denotes a $N_T/2 \times N$ base precoder, $$\Phi = \begin{bmatrix} 1 & 1 & \cdots & 1 \\ \varphi_{m,1} & \varphi_{m,2} & \cdots & \varphi_{m,N} \end{bmatrix}$$

denotes a 2×N transform precoder, $\phi_{m,n}$ denotes a complex number, ⊗ denotes a Kronecker tensor product of matrices, w(:,n) denotes the n'th column of the matrix, and n=1, ..., N.

The m denotes the index of different complex matrices $\Phi_m$ adopted in different mapping schemes.

It should be noted that the above dual-level codebook may be generated by using one or multiple $\Phi_m$. Different precoder c may be corresponding to different $\Phi_m$ and w, i.e., the w in the above formula may also be denoted by $w_k$. In this case, m is the index of those different matrices $\Phi_m$. For a single precoder c, the values of m and k do not mean anything. Only when multiple precoders are involved, the m and k are used for denoting the index of $\Phi_m$ and $w_k$ corresponding to the different precoders. This also applies to the following schemes.

From the above relation it can be obtained that when N=1, a precoder c in the dual-level codebook may satisfy:

$$c = \begin{bmatrix} w \\ \varphi_{m,1} w \end{bmatrix}$$

where, $\phi_m$ denotes a complex number, w denotes a $N_T/2 \times 1$ vector, m denotes the index of a precoder $\phi_m$ in the transform codebook.

When N>1, a precoder c in the dual-level codebook may satisfy:

$$c = \begin{bmatrix} w(:,1) & w(:,2) & \cdots & w(:,N) \\ \varphi_{m,1} w(:,1) & \varphi_{m,2} w(:,2) & \cdots & \varphi_{m,N} w(:,N) \end{bmatrix}$$

where, $\phi_{m,n}$ denotes a complex number, w(:,n) denotes the n'th column of matrix w which is a $N_T/2 \times N$ vector.

In addition, the dual-level codebook may further include a codebook in which some of the precoders have a dual-level structure. When a codebook includes at least one precoder c, there is a $N_T/2 \times N$ matrix w and a $2 \times N$ matrix $$\Phi = \begin{bmatrix} 1 & 1 & \cdots & 1 \\ \varphi_{m,1} & \varphi_{m,2} & \cdots & \varphi_{m,N} \end{bmatrix}$$

to make the precoder satisfy:

$$c = \begin{bmatrix} \begin{bmatrix} 1 \\ \varphi_{m,1} \end{bmatrix} \otimes w(:,1) & \begin{bmatrix} 1 \\ \varphi_{m,2} \end{bmatrix} \otimes w(:,2) & \cdots & \begin{bmatrix} 1 \\ \varphi_{m,N} \end{bmatrix} \otimes w(:,N) \end{bmatrix}$$

that is, $$c = \begin{bmatrix} w(:,1) & w(:,2) & \cdots & w(:,N) \\ \varphi_{m,1}w(:,1) & \varphi_{m,2}w(:,2) & \cdots & \varphi_{m,N}w(:,N) \end{bmatrix},$$

and the codebook can be regarded as a dual-level codebook.

In block 103, the transmitting end transmits the precoded data to the receiving end.

In block 103, the precoded data is transmitted to the receiving end. Through the above process, the method for transmitting information in a multi-antenna system is implemented.

Figure 2:
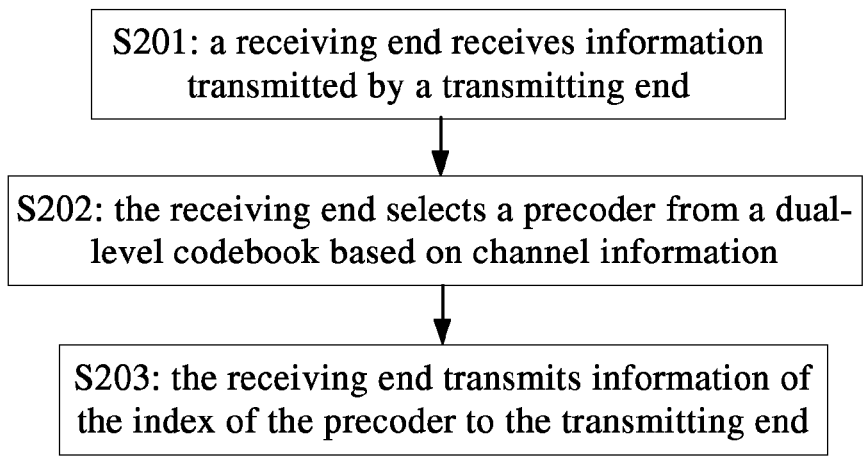
FIG. 2 is a flowchart illustrating a receiving method of a multi-antenna system in accordance with an embodiment of the present invention.

FIG. 2 is a flowchart illustrating a receiving method of a multi-antenna system in accordance with an embodiment of the present invention. The method may include the following procedures.

In block S101, a receiving end receives information transmitted by a transmitting end.

In block S201, the receiving end may receive the information transmitted by the transmitting end and measure a channel based on the information, e.g. measuring the channel based on common pilot.

In block S202, the receiving end selects a precoder from a dual-level codebook according to channel information.

In block S202, the receiving end may select a precoder from a dual-level codebook according to information of the channel.

That is, for an example, a receiving end of a MIMO system adopting OFDM modulation may receive signals from a transmitting end during receiving process, and convert the signals into frequency domain signals by FFT. The signals are processed through MIMO detection and are then divided into several layers. After de-layer mapping, the signals are then demodulated, de-interleaved and decoded. The received pilot signals are inputted into a channel estimation module for channel estimation. The receiving end selects a precoder from a dual-level codebook based on channel estimation information to optimize the performance. The optimization criterion may be FER, BER, SINR, mutual information, instantaneous throughput, or other applicable criteria. The receiving end may generate an index of the selected precoder for subsequent transmission of a transmitting end. The receiving end generates a CQI (Channel Quality Indication) to inform the transmitting end of the quality of the channel. The receiving end may further determine a rank and the number of data layers corresponding to the rank for subsequent data transmission. All of the above parameters obtained, including the precoder index, the CQI and the rank, are fed back to the transmitting end.

The dual-level codebook may include a fundamental codebook and a conversion codebook.

A base precoder in the base codebook is a $N_T/2 \times N$ matrix. The transform codebook defines a mapping scheme for converting a base precoder into a $N_T \times N$ precoder. $N_T$ is the number of transmit antennas of the MIMO system, N is rank, i.e. the number of layers of a transmitted signal in the MIMO system. In the following description, a precoder in the base codebook is referred to as base precoder for short, and a precoder in the transform codebook as a transform precoder.

A precoder c in the dual-level codebook may satisfy:

$$c = \begin{bmatrix} \begin{bmatrix} 1 \\ \varphi_{m,1} \end{bmatrix} \otimes w(:,1) & \begin{bmatrix} 1 \\ \varphi_{m,2} \end{bmatrix} \otimes w(:,2) & \cdots & \begin{bmatrix} 1 \\ \varphi_{m,N} \end{bmatrix} \otimes w(:,N) \end{bmatrix}$$

that is, $$c = \begin{bmatrix} w(:,1) & w(:,2) & \cdots & w(:,N) \\ \varphi_{m,1}w(:,1) & \varphi_{m,2}w(:,2) & \cdots & \varphi_{m,N}w(:,N) \end{bmatrix}$$

where, w denotes a $N_T/2 \times N$ base precoder, $$\Phi_m = \begin{bmatrix} 1 & 1 & \cdots & 1 \\ \varphi_{m,1} & \varphi_{m,2} & \cdots & \varphi_{m,N} \end{bmatrix}$$

denotes a $2 \times N$ transform precoder, $\phi_{m,n}$ denotes a complex number, $\otimes$ denotes a Kronecker tensor product of matrices, w(:,n) denotes the n'th column of the matrix, and n=1, ..., N.

In addition, the dual-level codebook may further include a codebook in which only some of the precoders have a dual-level structure. When a codebook includes at least one precoder c, there is a $N_T/2 \times N$ matrix c and a $2 \times N$ matrix $$\Phi_m = \begin{bmatrix} 1 & 1 & \cdots & 1 \\ \varphi_{m,1} & \varphi_{m,2} & \cdots & \varphi_{m,N} \end{bmatrix}$$

to make the precoder satisfy:

$$c = \begin{bmatrix} \begin{bmatrix} 1 \\ \varphi_{m,1} \end{bmatrix} \otimes w(:,1) & \begin{bmatrix} 1 \\ \varphi_{m,2} \end{bmatrix} \otimes w(:,2) & \cdots & \begin{bmatrix} 1 \\ \varphi_{m,N} \end{bmatrix} \otimes w(:,N) \end{bmatrix}$$

that is, $$c = \begin{bmatrix} w(:,1) & w(:,2) & \cdots & w(:,N) \\ \varphi_{m,1}w(:,1) & \varphi_{m,2}w(:,2) & \cdots & \varphi_{m,N}w(:,N) \end{bmatrix},$$

and the codebook is regarded as a dual-level codebook.

In block S203, the receiving end transmits information of the index of the selected precoder to the transmitting end.

In block S203, the receiving end transmits index information of the selected precoder to the transmitting end. Through the above process, the method for receiving information in a multi-antenna system is implemented.

Figure 3:
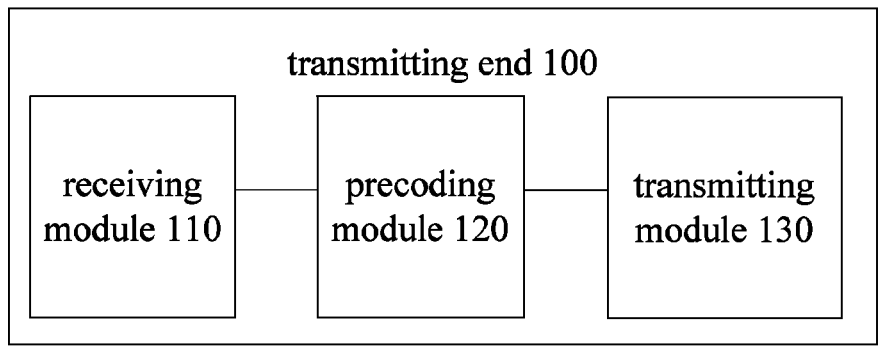
FIG. 3 is a schematic illustrating a structure of a transmitting end in accordance with an embodiment of the present invention.

FIG. 3 is a schematic illustrating a structure of a transmitting end 100 in accordance with an embodiment of the present invention. The transmitting end may include a receiving module 110, a precoding module 120 and a transmitting module 130.

The receiving module 110 is for receiving information transmitted by a receiving end. The information may include information of an index of a precoder.

The precoding module 120 is for selecting a precoder from a dual-level codebook based on the information of the index of the precoder, and precoding to-be-transmitted data by using the precoder or by using a precoding matrix obtained by further processing the precoder, e.g. performing zero-forcing on the precoder, etc.

The transmitting module 103 is for transmitting the precoded data to the receiving end.

The dual-level codebook may include a base codebook and a transform codebook.

A base precoder in the base codebook is a $N_T/2 \times N$ matrix. The transform codebook defines a mapping scheme for converting a base precoder into a $N_T \times N$ precoder c. $N_T$ is the number of transmit antennas of the MIMO system, N is rank, i.e. the number of layers of signals transmitted in the MIMO system.

A precoder c in the dual-level codebook may satisfy:

$$c = \left[\begin{bmatrix} 1 \\ \varphi_{m,1} \end{bmatrix} \otimes w(:,1) \begin{bmatrix} 1 \\ \varphi_{m,2} \end{bmatrix} \otimes w(:,2) \cdots \begin{bmatrix} 1 \\ \varphi_{m,N} \end{bmatrix} \otimes w(:,N)\right]$$

that is, $$c = \begin{bmatrix} w(:,1) & w(:,2) & \cdots & w(:,N) \\ \varphi_{m,1}w(:,1) & \varphi_{m,2}w(:,2) & \cdots & \varphi_{m,N}w(:,N) \end{bmatrix}$$

where, w denotes a $N_T/2 \times N$ base precoder, $$\Phi_m = \begin{bmatrix} 1 & 1 & \cdots & 1 \\ \varphi_{m,1} & \varphi_{m,2} & \cdots & \varphi_{m,N} \end{bmatrix}$$

denotes a $2 \times N$ transform precoder, $\phi_{m,n}$ denotes a complex number, $\otimes$ denotes a Kronecker tensor product of matrices, w(:,n) denotes the n'th column of the matrix, and n=1, ..., N.

In addition, the dual-level codebook may further include a codebook in which only some of precoders have a dual-level structure. When a codebook includes at least one precoder c, there is a $N_T/2 \times N$ matrix w and a $2 \times N$ matrix $$\Phi_m = \begin{bmatrix} 1 & 1 & \cdots & 1 \\ \varphi_{m,1} & \varphi_{m,2} & \cdots & \varphi_{m,N} \end{bmatrix}$$

to make the precoder satisfy:

$$c = \left[\begin{bmatrix} 1 \\ \varphi_{m,1} \end{bmatrix} \otimes w(:,1) \begin{bmatrix} 1 \\ \varphi_{m,2} \end{bmatrix} \otimes w(:,2) \cdots \begin{bmatrix} 1 \\ \varphi_{m,N} \end{bmatrix} \otimes w(:,N)\right]$$

and the codebook is regarded as a dual-level codebook.

Figure 4:
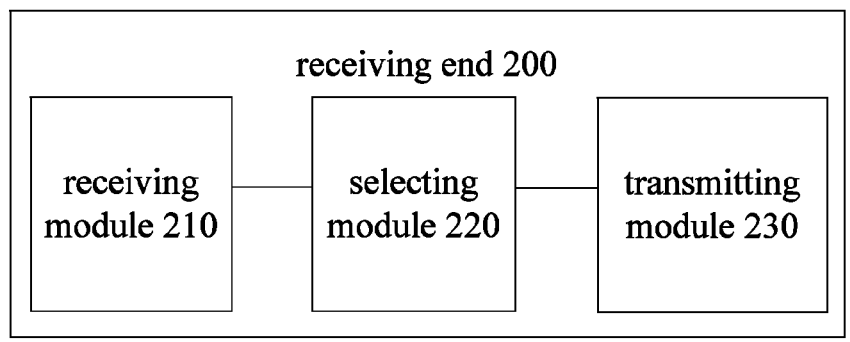
FIG. 4 is a schematic illustrating a structure of a receiving end in accordance with an embodiment of the present invention.

FIG. 4 is a schematic illustrating a structure of a receiving end 200 in accordance with an embodiment of the present invention. The receiving end may include a receiving module 210, a selecting module 220 and a transmitting module 230.

The receiving module 210 is for receiving information transmitted by a transmitting end, and measuring a channel by using the information.

The selecting module 220 is for selecting a precoder from a dual-level codebook according to channel information.

The transmitting module 230 is for transmitting information of the index of the precoder to the transmitting end.

The dual-level codebook may include a base codebook and a transform codebook.

A base precoder in the base codebook is a $N_T/2 \times N$ matrix. The transform codebook defines a mapping scheme for converting the base precoder into a $N_T \times N$ precoder c. $N_T$ is the number of transmit antennas of the MIMO system, N is Rank, i.e. the number of layers of signals transmitted in the MIMO system.

A precoder c in the dual-level codebook may satisfy:

$$c = \left[\begin{bmatrix} 1 \\ \varphi_{m,1} \end{bmatrix} \otimes w(:,1) \begin{bmatrix} 1 \\ \varphi_{m,2} \end{bmatrix} \otimes w(:,2) \cdots \begin{bmatrix} 1 \\ \varphi_{m,N} \end{bmatrix} \otimes w(:,N)\right]$$

that is, $$c = \begin{bmatrix} w(:,1) & w(:,2) & \cdots & w(:,N) \\ \varphi_{m,1}w(:,1) & \varphi_{m,2}w(:,2) & \cdots & \varphi_{m,N}w(:,N) \end{bmatrix}$$

where, w denotes a $N_T/2 \times N$ base precoder, $$\Phi_m = \begin{bmatrix} 1 & 1 & \cdots & 1 \\ \varphi_{m,1} & \varphi_{m,2} & \cdots & \varphi_{m,N} \end{bmatrix}$$

denotes a $2 \times N$ transform precoder, $\phi_{m,n}$ denotes a complex number, $\otimes$ denotes a Kronecker tensor product of matrices, w(:,n) denotes the n'th column of the matrix, and n=1, ..., N.

In addition, the dual-level codebook may further include a codebook in which only part of precoders have a dual-level structure. When a codebook include at least one precoder c and there is a $N_T/2 \times N$ matrix w and a $2 \times N$ matrix $$\Phi_m = \begin{bmatrix} 1 & 1 & \cdots & 1 \\ \varphi_{m,1} & \varphi_{m,2} & \cdots & \varphi_{m,N} \end{bmatrix}$$

to make the precoder satisfy:

$$c = \left[\begin{bmatrix} 1 \\ \varphi_{m,1} \end{bmatrix} \otimes w(:,1) \begin{bmatrix} 1 \\ \varphi_{m,2} \end{bmatrix} \otimes w(:,2) \cdots \begin{bmatrix} 1 \\ \varphi_{m,N} \end{bmatrix} \otimes w(:,N)\right],$$

then the codebook is regarded as a dual-level codebook.

The method of constructing a dual-level codebook may be as follows.

Figure 5:
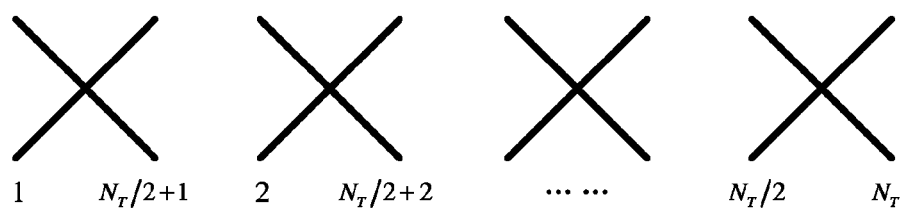
FIG. 5 is a schematic illustrating an antenna labeling manner of a dual-polarized antenna in accordance with an embodiment of the present invention.

Suppose the MIMO system includes transmit antennas whose amount is $N_T$, receiving antennas whose amount is $N_R$, the Rank is N, where $N_T$ is an even number, and $N_R$, $N \geq 1$. For facilitating description, the manner of labeling antennas of a dual-polarized antenna is firstly defined. As shown in FIG. 5, the manner of labeling antennas includes: labeling antennas in the same polarized direction in sequence, and then labeling antennas in another polarized direction in sequence. It should be noted that the codebook of a dual-polarized antenna system and construction method of the codebook is independent from the method for labeling antennas of a dual-polarized antenna. If the pre-determined method of labeling antennas is changed, only labels of antennas used in the codebook construction method need to be adjusted.

The method for designing and constructing a codebook provided by an embodiment of the present invention may include the following three procedures.

(1) a group of codebooks is constructed, the number of precoders in the group is $N_1$ and each precoder is a $N_T/2 \times N$ matrix; and the group of codebooks is referred to as a base codebook, where $N_1$ is a positive integer.

Specifically, the distribution characteristics of spatial correlated channels are mainly affected by the adopted antenna array configurations. Taking a uniform linear array as an example, a principal eigen vector of a MIMO channel matrix may be represented by an array response. For example, a uniform linear array including $N_T/2$ antennas, the antenna spacing is d, the wavelength of the frequency band used is about $\lambda$, the angle of the array response is $\alpha$, the principal eigen vector of the channel matrix may be expressed approximately by the following formula:

$$a = \left[1 \; \cdots \; \exp\left(j2\pi \frac{kd}{\lambda} \sin \alpha\right) \; \cdots \; \exp\left(j2\pi \frac{(N_T/2 - 1)d}{\lambda} \sin \alpha\right)\right]^T$$

Other characteristic vectors of the MIMO channel matrix may also be expressed approximately by array responses.

A base codebook including $N_1$ $N_T/2 \times N$ precoders may be constructed based on the distribution characteristics of a spatial correlated channel, where $N_1$ is the number of precoders. For example, a column vector of a DFT matrix is suitable for fitting an array response of a uniform linear array, thus can be used as a base precoder of Rank 1.

A DFT matrix is in the form of:

$$D = [d_0 \, d_1 \ldots d_M],$$

D is a $N_T/2 \times M$ matrix in which the element at the row n+1 and the column m+1 is $D_{1+n,1+m}$, $$D_{1+n,1+m} = \exp(j2\pi nm/M),$$

where $n=0, \ldots, N_T/2-1$, $m=0, \ldots, M-1$, and $M \geq N_T/2$, column vectors $d_0, \ldots, d_M$ of matrix D are all $N_T/2 \times 1$ DFT vectors.

(2) a group of codebooks including $N_2$ precoders are constructed and referred to as a transform codebook, where each precoder is a $2 \times N$ matrix, $N_2$ is the number of precoders and is a positive integer.

Specifically, channels of two groups of polarized antennas of a dual-polarized antenna have the same distribution characteristics, and have little correlation with each other. The phase relation between two groups of polarized channels may be quantized by using a group of complex numbers whose module value is 1 to construct the transform codebook.

(3) a dual-level codebook including $N_1 \cdot N_2$ precoders is obtained by using the base codebooks and the transform codebooks.

The codebook obtained in block (3) may be searched by using a certain optimization principle to reduce the size and the Rank of the codebook. Alternatively, the codebook obtained in block (3) may directly be adopted as the codebook finally used.

Figure 6:
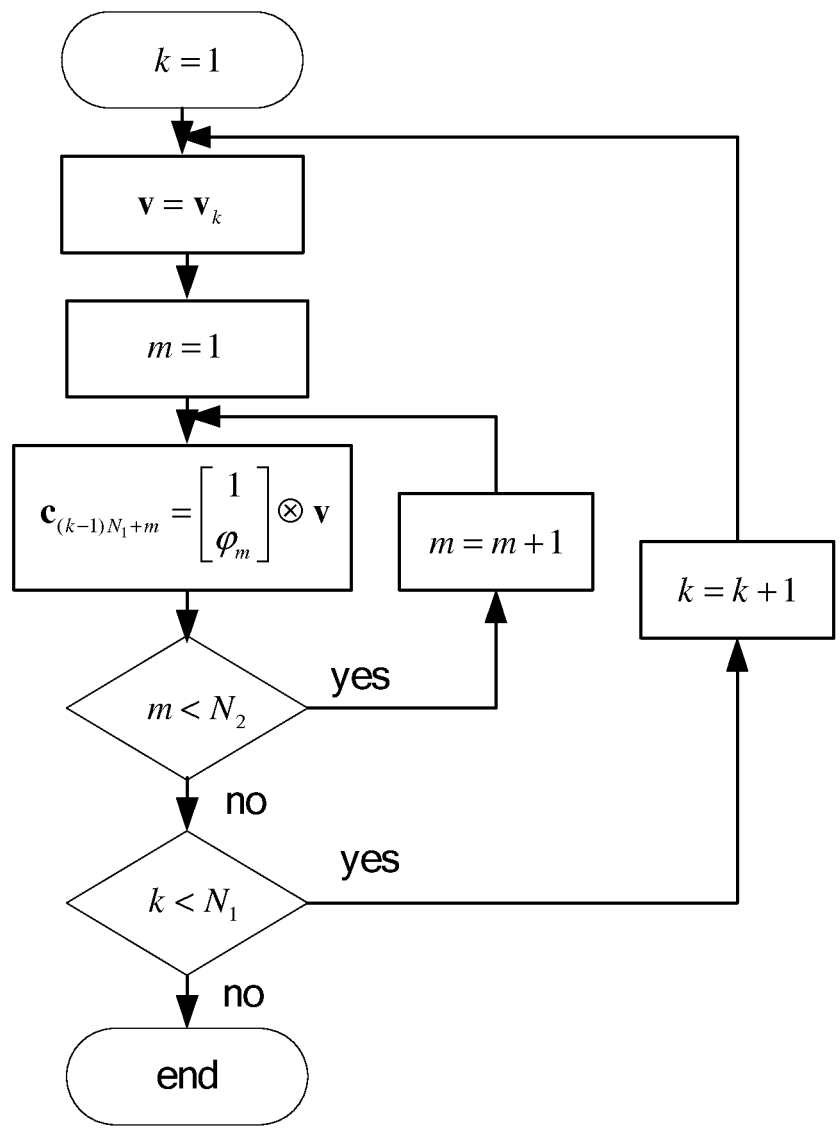
FIG. 6 is a flowchart illustrating a process of constructing a two-hierarchy codebook of Rank 1 by using a fundamental codebook and a conversion codebook in accordance with an embodiment of the present invention.

FIG. 6 is a flowchart illustrating a process of constructing a Rank 1 codebook by using a base codebook and a transform codebook.

A base precoder is taken to combine with each transform precoder in a transform codebook to obtain precoders corresponding to the transform precoders. The manner of the combining may be as shown in FIG. 6. The above procedure is repeated for $N_1$ times to obtain $N_1 \times N_2$ precoders which forms a dual-level Rank 1 codebook. $N_T/2$ vector $v_k$, $k=1, \ldots, N_1$ is a precoder in a base codebook, and is referred to as a base precoder for short. $2 \times 1$ vector $[1 \; \phi_m]^T$, $m=1, \ldots, N_2$ is a precoder in a transform codebook, and is referred to as a transform precoder for short. $N_T \times 1$ vector $c_i$, $i=1, \ldots, N_1 \cdot N_2$ is a precoder in a dual-level codebook. $\otimes$ denotes the Kronecker tensor product of matrices. Alternatively, $N_T/2$ vector $v_k$, $k=0, 1, \ldots, N_1-1$ is a base precoder; $2 \times 1$ vector $[1 \; \phi_m]^T$, $m=0, 1, \ldots, N_2-1$ is a transform precoder. $N_T \times 1$ vector $c_i$, $i=0, 1, \ldots, N_1 \cdot N_2-1$ is a precoder in a dual-level codebook. $\otimes$ denotes the Kronecker tensor product of matrices. It can be seen that the start value of k, m, i may be 0 or 1, but the total amounts are $N_1$, $N_2$ and $N_1 \cdot N_2$ respectively.

Figure 7:
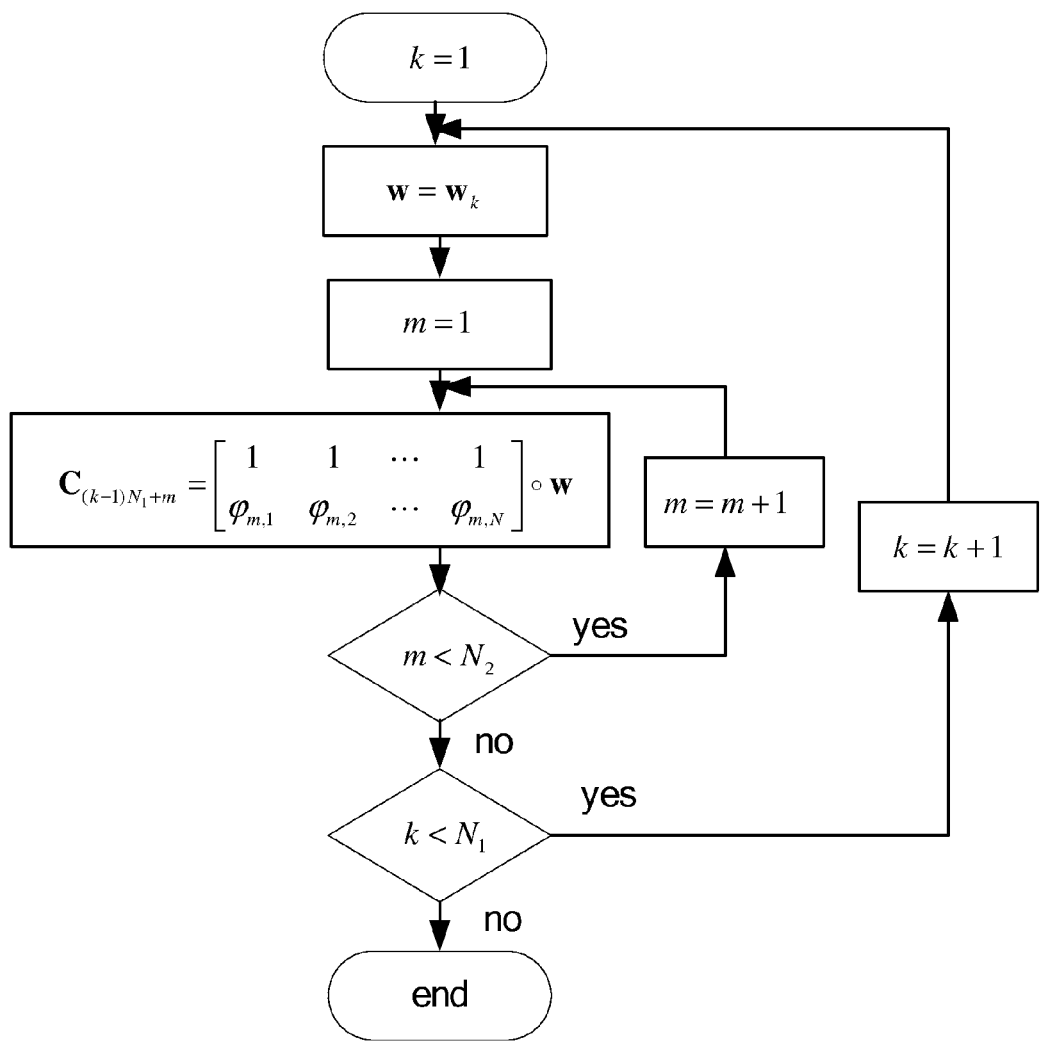
FIG. 7 is a flowchart illustrating a process of constructing a two-hierarchy codebook of Rank N by using a fundamental codebook and a conversion codebook in accordance with an embodiment of the present invention.

FIG. 7 is a flowchart illustrating a process of constructing a Rank-N codebook by using a base codebook and a transform codebook. A base precoder is taken to combine with each transform precoder in a transform codebook respectively to obtain precoders corresponding to the transform precoders. The manner of the combining may be as shown in FIG. 7. The above procedure is repeated for $N_1$ times to obtain $N_1 \cdot N_2$ precoders which forms a dual-level Rank 1 codebook, where $N_1 \cdot N_2$ is the number of precoders. $w_k$, $k=1, \ldots, N_1$ is a base precoder, $2 \times N$ matrix $$\Phi_m = \begin{bmatrix} 1 & 1 & \cdots & 1 \\ \varphi_{m,1} & \varphi_{m,2} & \cdots & \varphi_{m,N} \end{bmatrix}, m = 1, \cdots, N_2$$

is a transform precoder; $C_i$, $i=1, \ldots, N_1 \cdot N_2$ is a precoder in a dual-level codebook; definition of the operator $\circ$ is:

$$\begin{bmatrix} 1 & 1 & \cdots & 1 \\ \varphi_{m,1} & \varphi_{m,2} & \cdots & \varphi_{m,N} \end{bmatrix} \circ w =$$

$$\left[ \begin{bmatrix} 1 \\ \varphi_{m,1} \end{bmatrix} \otimes w(:,1) \; \begin{bmatrix} 1 \\ \varphi_{m,2} \end{bmatrix} \otimes w(:,2) \; \cdots \; \begin{bmatrix} 1 \\ \varphi_{m,N} \end{bmatrix} \otimes w(:,N) \right]$$

that is, $$c = \begin{bmatrix} w(:,1) & w(:,2) & \cdots & w(:,N) \\ \varphi_{m,1} w(:,1) & \varphi_{m,2} w(:,2) & \cdots & \varphi_{m,N} w(:,N) \end{bmatrix}$$

$w(:,n)$ denotes the n'th column of matrix w. The start value of k, m, i may be 0, i.e.

$$w_k, k = 0, 1, \cdots, N_1 - 1, \Phi_m = \begin{bmatrix} 1 & 1 & \cdots & 1 \\ \varphi_{m,1} & \varphi_{m,2} & \cdots & \varphi_{m,N} \end{bmatrix},$$

$$m = 0, 1, \cdots, N_2 - 1,$$

$C_i$, $i=0, 1, \ldots, N_1 \cdot N_2-1$.

When N=1, a precoder c in the dual-level codebook may satisfy:

$$c = \begin{bmatrix} w \\ \varphi_{m,1} w \end{bmatrix},$$

where $\varphi_m$ is a complex number, and w is a $N_T/2 \times 1$ vector.

When N>1, a precoder c in the dual-level codebook may satisfy:

$$c = \begin{bmatrix} w(:,1) & w(:,2) & \cdots & w(:,N) \\ \varphi_{m,1} w(:,1) & \varphi_{m,2} w(:,2) & \cdots & \varphi_{m,N} w(:,N) \end{bmatrix}$$

where, $\varphi_{m,n}$ is a complex number, w(:,n) is the n'th column of matrix w which is a $N_T/2 \times N$ vector. A few examples of the dual-level codebook are as follows.

Codebook of type 1:

TABLE 1 base codebook of Rank 1

| index | $v_k$ |
|---|---|
| 0 | $v_0 = [1\ 1\ 1\ 1]^T$ |
| 1 | $v_1 = [1\ j\ -1\ -j]^T$ |
| 2 | $v_2 = [1\ -1\ 1\ -1]^T$ |
| 3 | $v_3 = [1\ -j\ -1\ j]^T$ |
| 4 | $v_4 = [1\ (1+j)/\sqrt{2}\ j\ (-1+j)/\sqrt{2}]^T$ |
| 5 | $v_5 = [1\ (-1+j)/\sqrt{2}\ -j\ (1+j)/\sqrt{2}]^T$ |
| 6 | $v_6 = [1\ (-1-j)/\sqrt{2}\ j\ (1-j)/\sqrt{2}]^T$ |
| 7 | $v_7 = [1\ (1-j)/\sqrt{2}\ -j\ (-1-j)/\sqrt{2}]^T$ |

TABLE 2 transform codebook of Rank 1

| Size of transform codebook | Transform codebook $\phi^m$ |
|---|---|
| 2 | $\phi_0 = 1, \phi_1 = -1$ |
| 4 | $\phi_0 = 1, \phi_1 = -1, \phi_2 = j, \phi_3 = -j$ |

Dual-level codebook of Rank 1:

$$c_i = \frac{1}{\sqrt{N_T}} \begin{bmatrix} v_k \\ \varphi_m v_k \end{bmatrix} = \frac{1}{\sqrt{N_T}} \begin{bmatrix} v_k & 0 \\ 0 & v_k \end{bmatrix} \begin{bmatrix} 1 \\ \varphi_m \end{bmatrix},$$

where k=0, ..., 7, m=0, 1, i=2k+m, or m=0, ..., 3, i=4k+m. The m, k denotes the index of precoders in the transform codebook and the base codebook respectively, and this also applies to the following description.

TABLE 3 base codebook of Rank 2

| index | $w_k$ |
|---|---|
| 0 | $w_0 = [v_0\ v_4]$ |
| 1 | $w_1 = [v_1\ v_5]$ |
| 2 | $w_2 = [v_2\ v_6]$ |
| 3 | $w_3 = [v_3\ v_7]$ |
| 4 | $w_4 = [v_4\ v_1]$ |
| 5 | $w_5 = [v_5\ v_2]$ |
| 6 | $w_6 = [v_6\ v_3]$ |
| 7 | $w_7 = [v_7\ v_0]$ |

TABLE 4 transform codebook of Rank 2

| Size of transform codebook | Transform codebook $\Phi_m$ |
|---|---|
| 2 | $\Phi_0 = \begin{bmatrix} 1 & 1 \\ 1 & -1 \end{bmatrix}, \Phi_1 = \begin{bmatrix} 1 & 1 \\ -1 & 1 \end{bmatrix}$ |
| 4 | $\Phi_0 = \begin{bmatrix} 1 & 1 \\ 1 & -1 \end{bmatrix}, \Phi_1 = \begin{bmatrix} 1 & 1 \\ -1 & 1 \end{bmatrix}$ $\Phi_2 = \begin{bmatrix} 1 & 1 \\ j & -j \end{bmatrix}, \Phi_3 = \begin{bmatrix} 1 & 1 \\ -j & j \end{bmatrix}$ |

Dual-level codebook of Rank 2:

$$C_i = \frac{1}{\sqrt{2N_T}} \Phi_m \circ w_k$$

k=0, ... 7, m=0, 1, i=2k+m, or m=0, ..., 3, i=4k+m.
Definition of operator ∘ is as follows.

$$A \circ B = [A(:,1) \otimes B(:,1)\ A(:,2) \otimes B(:,2) \ldots A(:,N) \otimes B(:,N)]$$

A(:,n) denotes the n'th column of matrix A.

It should be noted that the above Rank 1 base precoder $v_k$ and Rank 2 base precoder $w_k$ are actually the above mentioned precoders in a base codebook, and different symbols are used to clearly present the nesting relation between the Rank 2 base precoder $w_k$ and the Rank 1 base precoder $v_k$, and this also applies to the following description.

Codebook of type 2:

TABLE 5 base codebook of Rank 1

| index | $v_k$ |
|---|---|
| 0 | $v_0 = [1\ -(1+j)/\sqrt{2}\ (1+j)/\sqrt{2}\ -j]^T$ |
| 1 | $v_1 = [1\ -(1+j)/\sqrt{2}\ j\ (1-j)/\sqrt{2}]^T$ |
| 2 | $v_2 = [1\ -j\ -1\ j]^T$ |
| 3 | $v_3 = [1\ (1-j)/\sqrt{2}\ -j\ (-1-j)/\sqrt{2}]^T$ |
| 4 | $v_4 = [1\ 1\ 1\ 1]^T$ |
| 5 | $v_5 = [1\ (1+j)/\sqrt{2}\ j\ (-1+j)/\sqrt{2}]^T$ |
| 6 | $v_6 = [1\ j\ -1\ -j]^T$ |
| 7 | $v_7 = [1\ (-1+j)/\sqrt{2}\ -j\ (1+j)/\sqrt{2}]^T$ |

TABLE 6 transform codebook of Rank 1

| Size of transform codebook | Transform codebook $\phi_m$ |
|---|---|
| 2 | $\phi_0 = 1, \phi_1 = -1$ |
| 4 | $\phi_0 = 1, \phi_1 = -1, \phi_2 = j, \phi_3 = -j$ |

Dual-level codebook of Rank 1:

$$c_i = \frac{1}{\sqrt{N_T}} \begin{bmatrix} v_k \\ \varphi_m v_k \end{bmatrix} = \frac{1}{\sqrt{N_T}} \begin{bmatrix} v_k & 0 \\ 0 & v_k \end{bmatrix} \begin{bmatrix} 1 \\ \varphi_m \end{bmatrix}$$

k=0, ..., 7 m=0, 1, i=2k+m, or m=0, ..., 3, i=4k+m.

TABLE 7 base codebook of Rank 2

| index | $w_k$ |
|---|---|
| 0 | $w_0 = [v_0\ v_1]$ |
| 1 | $w_1 = [v_1\ v_2]$ |
| 2 | $w_2 = [v_2\ v_3]$ |
| 3 | $w_3 = [v_3\ v_4]$ |
| 4 | $w_4 = [v_4\ v_5]$ |
| 5 | $w_5 = [v_5\ v_6]$ |
| 6 | $w_6 = [v_6\ v_7]$ |
| 7 | $w_7 = [v_7\ v_0]$ |

TABLE 8 transform codebook of Rank 2

| Size of transform codebook | Transform codebook $\Phi_m$ |
|---|---|
| 2 | $\Phi_0 = \begin{bmatrix} 1 & 1 \\ 1 & -1 \end{bmatrix},\ \Phi_1 = \begin{bmatrix} 1 & 1 \\ -1 & 1 \end{bmatrix}$ |
| 4 | $\Phi_0 = \begin{bmatrix} 1 & 1 \\ 1 & -1 \end{bmatrix},\ \Phi_1 = \begin{bmatrix} 1 & 1 \\ -1 & 1 \end{bmatrix}$ $\Phi_2 = \begin{bmatrix} 1 & 1 \\ j & -j \end{bmatrix},\ \Phi_3 = \begin{bmatrix} 1 & 1 \\ -j & j \end{bmatrix}$ |

Dual-level codebook of Rank 2:

$$C_i = \frac{1}{\sqrt{2N_t}} \Phi_m \circ w_k$$

$k=0, \ldots, 7$ $m=0, 1$, $i=2k+m$, or $m=0, \ldots, 3$, $i=4k+m$.
Definition of operator $\circ$ is as follows.

$$A \circ B = [A(:,1) \otimes B(:,1)\ A(:,2) \otimes B(:,2) \ldots A(:,N) \otimes B(:,N)]$$

A(:,n) denotes the n'th column of matrix A.

It should be noted that applying different mathematical transformations to the same base codebook and transform codebook may obtain the same dual-level codebook. Therefore, the method of generating a codebook based on a base codebook and a transform codebook is not limited by the mathematical transforming manner adopted. Although the codebook provided by the present invention is designed for dual-polarized antenna application scenarios, but can also be applicable to other antenna application scenarios.

In the above embodiments, the receiving end may include a base station or a terminal; likewise, the transmitting end may also include a base station or a terminal.

The technical scheme of the present invention obtains codebooks most suitable with channel distribution characteristics of dual-polarized antennas and minimizes performance loss brought by codebook quantization to remarkably improve the performances of precoding systems. In addition, the codebook generated according to the present invention inherits most characteristics of the codebook for 4 antennas of Rel-8 LTE, has good performance. When the codebook of Rank-N is designed properly, the codebook has nesting characteristic, and the technical scheme requires little modification to existing systems without impacting system compatibility, and has low implementation complexity and is highly efficient.

Those skilled in the art can understand that some or all of the steps of the methods provided by the embodiments may be implemented by hardware controlled by software. The software may be stored in a computer-readable storage medium.

The functional units of each embodiment of the present invention may be integrated into one processing module or be physically standalone; or two or multiple units may be integrated into one module. The integrated module may be implemented by hardware, or by software functional module. The integrated module may be stored in a computer readable storage medium when implemented by software and sold or used as an individual product.

The above storage medium may be a ROM, a magnetic disk, a compact disk, and etc.

The forgoing is only preferred embodiments of the present invention. It is should be noted that, improvements and modifications made by those skilled in the art without departing from the principle of the present invention should be covered by the protection scope of the present invention.

The invention claimed is:

1. A method for transmitting information in a multi-antenna system, comprising:
   receiving, by a transmitting end, information which comprises information of an index of a precoder transmitted by a receiving end;
   selecting, by the transmitting end, a precoder from a dual-level codebook based on the information of the index of the precoder, and precoding to-be-transmitted data by using the precoder; and
   transmitting, by the transmitting end, the precoded data to the receiving end;
   wherein at least one precoder c in the dual-level codebook satisfies:

$$c = \left[ \begin{bmatrix} 1 \\ \varphi_{m,1} \end{bmatrix} \otimes w(:,1)\ \begin{bmatrix} 1 \\ \varphi_{m,2} \end{bmatrix} \otimes w(:,2) \cdots \begin{bmatrix} 1 \\ \varphi_{m,N} \end{bmatrix} \otimes w(:,N) \right],$$

wherein w is a $N_T/2 \times N$ matrix, $$\begin{bmatrix} 1 & 1 & \cdots & 1 \\ \varphi_{m,1} & \varphi_{m,2} & \cdots & \varphi_{m,N} \end{bmatrix}$$

is a $2 \times N$ matrix, $N_T$ is the number of transmit antennas, N is Rank, $\phi_{m,n}$ denotes a complex number, $\otimes$ denotes a Kronecker tensor product of matrices, w(:,n) denotes the n'th column of matrix w, and $n=1, \ldots, N$.

2. The method of claim 1, wherein each column of matrix w is a Discrete Fourier Transform, DFT, vector.

3. The method of claim 1, wherein in the dual-level codebook,
at least one precoder c in a codebook of Rank 1 satisfies:

$$c = \begin{bmatrix} w \\ \varphi_{m,1} w \end{bmatrix},$$

wherein $\phi_{m,1}$ denotes a complex number, and w is a $N_T/2 \times 1$ vector;
at least one precoder c in a codebook of a Rank which is larger than 1 satisfies:

$$c = \begin{bmatrix} w(:,1) & w(:,2) & \cdots & w(:,N) \\ \varphi_{m,1}w(:,1) & \varphi_{m,2}w(:,2) & \cdots & \varphi_{m,N}w(:,N) \end{bmatrix}$$

wherein, $\phi_{m,n}$ denotes a complex number, w(:,n) denotes the n'th column of matrix w and w is a $N_T/2 \times N$ matrix.

4. The method of claim 1, wherein the dual-level codebook comprises:
a base codebook and a transform codebook;
a base precoder $w_k$ in the base codebook is a $N_T/2 \times N$ matrix; the transform codebook defines a mapping scheme for converting a base precoder into a $N_T \times N$ precoder c; $N_T$ is the number of transmit antennas of the MIMO system, N is Rank;
the mapping scheme comprises:

$$c = \begin{bmatrix} \begin{bmatrix} 1 \\ \varphi_{m,1} \end{bmatrix} \otimes w(:,1) & \begin{bmatrix} 1 \\ \varphi_{m,2} \end{bmatrix} \otimes w(:,2) & \cdots & \begin{bmatrix} 1 \\ \varphi_{m,N} \end{bmatrix} \otimes w(:,N) \end{bmatrix}$$

wherein $w_k$ is a $N_T/2 \times N$ matrix, $$\Phi_m = \begin{bmatrix} 1 & 1 & \cdots & 1 \\ \varphi_{m,1} & \varphi_{m,2} & \cdots & \varphi_{m,N} \end{bmatrix}$$

is a $2 \times N$ matrix, $N_T$ is the number of transmit antennas in the multi-antenna system, k is the index of a precoder in the base codebook, m is the index of a transform precoder in the transform codebook, $\phi_{m,n}$ denotes a complex number, $\otimes$ denotes a Kronecker tensor product of matrices, $w_k(:,n)$ denotes the n'th column of matrix $w_k$, and n=1, ..., N.

5. A method for receiving information in a multi-antenna system, comprising:
receiving, by a receiving end, information transmitted by a transmitting end, measuring a channel based on the information;
selecting, by the receiving end, a precoder from a dual-level codebook according to information of the channel;
transmitting, by the receiving end, information of the index of the selected precoder to the transmitting end;
wherein at least one precoder c in the dual-level codebook satisfies:

$$c = \begin{bmatrix} \begin{bmatrix} 1 \\ \varphi_{m,1} \end{bmatrix} \otimes w(:,1) & \begin{bmatrix} 1 \\ \varphi_{m,2} \end{bmatrix} \otimes w(:,2) & \cdots & \begin{bmatrix} 1 \\ \varphi_{m,N} \end{bmatrix} \otimes w(:,N) \end{bmatrix},$$

wherein w is a $N_T/2 \times N$ matrix, $$\Phi_m = \begin{bmatrix} 1 & 1 & \cdots & 1 \\ \varphi_{m,1} & \varphi_{m,2} & \cdots & \varphi_{m,N} \end{bmatrix}$$

is a $2 \times N$ matrix, $\phi_{m,n}$ denotes a complex number, $\otimes$ denotes a Kronecker tensor product of matrices, w(:, n) denotes the n'th column of matrix w, and n=1, ..., N.

6. The method of claim 5, wherein each column of matrix w is a Discrete Fourier Transform, DFT, vector.

7. The method of claim 5, wherein in the dual-level codebook,
at least one precoder c in a codebook of Rank 1 satisfies:

$$c = \begin{bmatrix} w \\ \varphi_{m,1}w \end{bmatrix},$$

wherein $\phi_{m,1}$ denotes a complex number, and w is a $N_T/2 \times 1$ vector;
at least one precoder c in a codebook of a Rank which is larger than 1 satisfies:

$$c = \begin{bmatrix} w(:,1) & w(:,2) & \cdots & w(:,N) \\ \varphi_{m,1}w(:,1) & \varphi_{m,2}w(:,2) & \cdots & \varphi_{m,N}w(:,N) \end{bmatrix},$$

wherein, $\phi_{m,n}$ denotes a complex number, w(:,n) denotes the n'th column of a $N_T/2 \times N$ matrix w.

8. The method of claim 5, wherein the dual-level codebook comprises:
a base codebook and a transform codebook;
a base precoder $w_k$ in the base codebook is a $N_T/2 \times N$ matrix; the transform codebook defines a mapping scheme for converting a base precoder into a $N_T \times N$ precoder c; $N_T$ is the number of transmit antennas of the MIMO system, N is Rank;
the mapping scheme comprises:

$$c = \begin{bmatrix} \begin{bmatrix} 1 \\ \varphi_{m,1} \end{bmatrix} \otimes w_k(:,1) & \begin{bmatrix} 1 \\ \varphi_{m,2} \end{bmatrix} \otimes w_k(:,2) & \cdots & \begin{bmatrix} 1 \\ \varphi_{m,N} \end{bmatrix} \otimes w_k(:,N) \end{bmatrix}$$

wherein $w_k$ is a $N_T/2 \times N$ matrix, $$\Phi_m = \begin{bmatrix} 1 & 1 & \cdots & 1 \\ \varphi_{m,1} & \varphi_{m,2} & \cdots & \varphi_{m,N} \end{bmatrix}$$

is a $2 \times N$ matrix, $N_T$ is the number of transmit antennas in the multi-antenna system, k is the index of a precoder in the base codebook, m is the index of a transform precoder in the transform codebook, $\phi_{m,n}$ denotes a complex number, $\otimes$ denotes a Kronecker tensor product of matrices, $w_k(:,n)$ denotes the n'th column of matrix $w_k$, and n=1, ..., N.

9. A multi-antenna system, comprising a transmitting end and a receiving end, wherein
the transmitting end comprises a receiving module, a precoding module and a transmitting module;
the receiving module is for receiving information transmitted by a receiving end, wherein the information comprises information of an index of a precoder;
the precoding module is for selecting a precoder from a dual-level codebook based on the information of the index of the precoder, and precoding to-be-transmitted data by using the precoder; and
the transmitting module is for transmitting the precoded data to the receiving end;
wherein at least one precoder c in the dual-level codebook satisfies:

$$c = \begin{bmatrix} \begin{bmatrix} 1 \\ \varphi_{m,1} \end{bmatrix} \otimes w(:,1) & \begin{bmatrix} 1 \\ \varphi_{m,2} \end{bmatrix} \otimes w(:,2) & \cdots & \begin{bmatrix} 1 \\ \varphi_{m,N} \end{bmatrix} \otimes w(:,N) \end{bmatrix}$$

wherein w is a $N_T/2 \times N$ matrix, $$\Phi_m = \begin{bmatrix} 1 & 1 & \cdots & 1 \\ \varphi_{m,1} & \varphi_{m,2} & \cdots & \varphi_{m,N} \end{bmatrix}$$

is a 2×N matrix, $\phi_{m,n}$ denotes a complex number, ⊗ denotes a Kronecker tensor product of matrices, w(:,n) denotes the w'th column of matrix n, and n=1, ..., N.

10. The multi-antenna of claim 9, wherein each column of matrix w is a Discrete Fourier Transform, DFT, vector.

11. The multi-antenna system of claim 9, wherein the receiving end comprises a receiving module, a selecting module and a transmitting module;
the receiving module is for receiving information transmitted by a transmitting end, and measuring a channel by using the information;
the selecting module is for selecting a precoder from a dual-level codebook according to information of the channel;
the transmitting module is for transmitting information of the index of the selected precoder to the transmitting end.

12. The multi-antenna system of claim 9, wherein the dual-level codebook comprises: a base codebook and a transform codebook;
a base precoder $w_k$ in the base codebook is a $N_T/2 \times N$ matrix; the transform codebook defines a mapping scheme for converting a base precoder into a $N_T \times N$ precoder c; $N_T$ is the number of transmit antennas of the MIMO system, N is Rank;
the mapping scheme comprises:

$$c = \left[ \begin{bmatrix} 1 \\ \varphi_{m,1} \end{bmatrix} \otimes w_k(:,1) \begin{bmatrix} 1 \\ \varphi_{m,2} \end{bmatrix} \otimes w_k(:,2) \cdots \begin{bmatrix} 1 \\ \varphi_{m,N} \end{bmatrix} \otimes w_k(:,N) \right]$$

wherein $w_k$ is a $N_T/2 \times N$ matrix, $$\Phi_m = \begin{bmatrix} 1 & 1 & \cdots & 1 \\ \varphi_{m,1} & \varphi_{m,2} & \cdots & \varphi_{m,N} \end{bmatrix}$$

is a 2×N matrix, $N_T$ is the number of transmit antennas in the multi-antenna system, k is the index of a precoder in the base codebook, m is the index of a transform precoder in the transform codebook, $\phi_{m,n}$ denotes a complex number, ⊗ denotes a Kronecker tensor product of matrices, $w_k(:,n)$ denotes the n'th column of matrix $w_k$, and n=1, ..., N.

13. The multi-antenna system of claim 9, wherein each column of matrix $w_k$ is a Discrete Fourier Transform, DFT, vector.

* * * * *